May 7, 1963 L. A. LYSTAD 3,088,153
REAR WINDOW WASHER
Filed Dec. 18, 1961
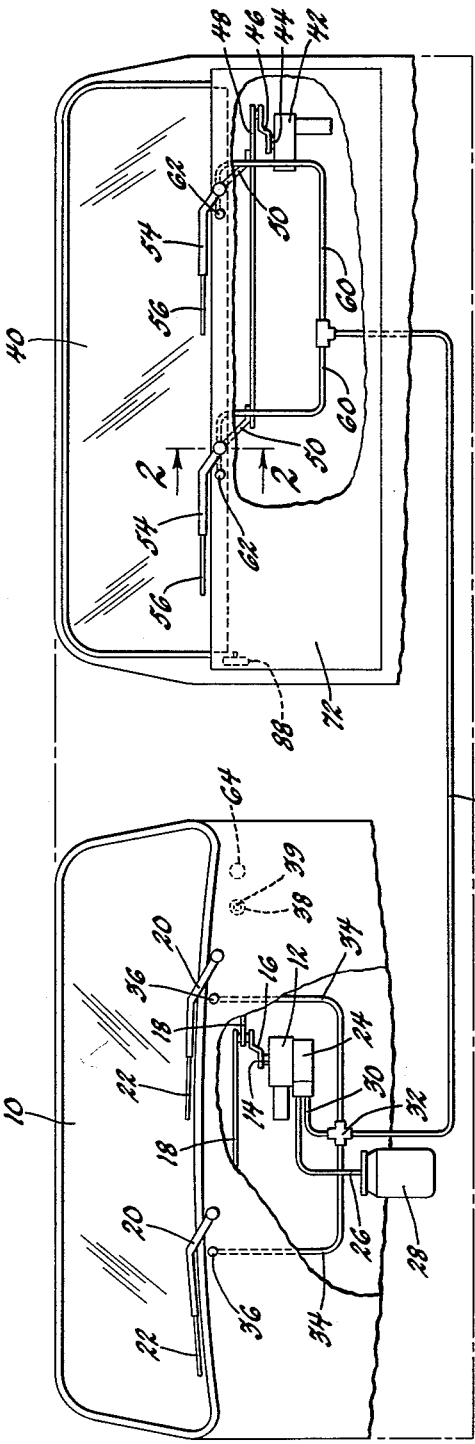
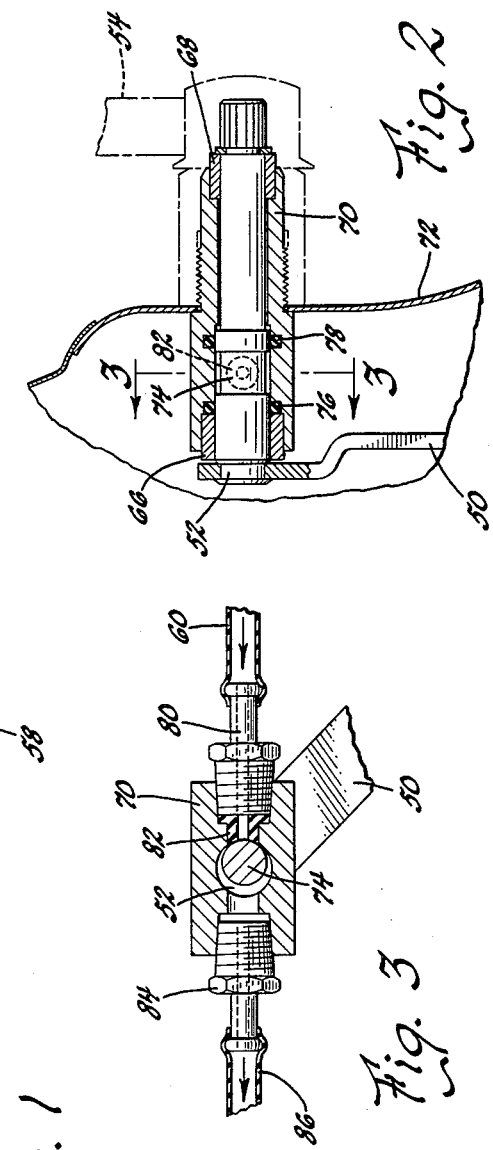
INVENTOR.
Leonard A. Lystad
BY
HIS ATTORNEY United States Patent Office 3,088,153
Patented May 7, 1963

3,088,153
REAR WINDOW WASHER
Leonard A. Lystad, Warren, Mich., assignor to General Motors Corporation, Detroit, Mich., a corporation of Delaware
Filed Dec. 18, 1961, Ser. No. 160,067
6 Claims. (Cl. 15—250.02)

This invention relates to vehicles, and particularly to a cleaning system for the rear windows of station wagon-type vehicles.

As pointed out in copending application No. 160,081, filed of even date herewith in the names of Arthur J. Carpenter and Harry A. Mackie and assigned to the assignee of this invention, the need has long been recognized to provide adequate rearward vision in station wagon-type vehicles having substantially vertical rear windows which are capable of being raised and lowered. The present invention relates particularly to a washer unit for the rear windows of such vehicles embodying means precluding operation of the washer unit when the wiper blades are in their parked position so as to prevent the discharge of washer solvent into the interior of the vehicle when the rear window is lowered. Accordingly, among my objects are the provision of a rear window washer unit for vehicles; the further provision of a rear window cleaning system including means preventing operation of the washer unit when the wiper unit is parked, and the still further provision of pivot shaft operated valve means for blocking the washer conduit when the wiper blades are parked.

The aforementioned and other objects are accomplished in the present invention by forming an eccentric portion on the pivot shaft of each wiper assembly, and utilizing the eccentric portion as a valve for closing its respective washer conduit when the wiper blades are in their parked position. Specifically, the present invention comprehends a coordinated cleaning system for the windshield and the rear window of the vehicle wherein a single washer pump driven by the windshield wiper motor is used to supply washer solvent to both the windshield and the rear window. It will be appreciated that with this type of system whenever the vehicle operator initiates operation of the windshield cleaning system, liquid solvent will be supplied to the rear washer unit, but only if the rear wiper unit is operating and the rear window is substantially fully raised. To accomplish this result, the pivot shaft for each rear window wiper is journalled in a housing and has an eccentric portion disposed between its ends. The eccentric portion acts as a valve to close the washer conduit when the wiper blades are in their parked position. Since the rear window wiper unit can only be operated when the window is substantially fully closed in accordance with the teachings of the aforementioned copending application, the possibility of spraying liquid solvent into the interior of the vehicle will be precluded.

Further objects and advantages of the present invention will be apparent from the following description, reference being had to the accompanying drawing, wherein a preferred embodiment of the present invention is clearly shown.

In the drawing:

FIGURE 1 is a schematic depicting a vehicle having a windshield cleaning system and a rear window cleaning system.

FIGURE 2 is an enlarged, fragmentary sectional view taken along line 2—2 of FIGURE 1.

FIGURE 3 is a fragmentary, sectional view taken along line 3—3 of FIGURE 2.

With particular reference to FIGURE 1, the present invention comprehends a cleaning system for a windshield 10 comprising a wiper unit and a washer unit. The wiper unit preferably includes an electric wiper motor 12 having a rotary output shaft 14 with a drive crank 16 to which the inner ends of links 18 are pivotally connected. The outer ends of links 18 are drivingly connected to crank arms, not shown, attached to pivot shafts, not shown, which carry wiper arms 20. The wiper arms carry wiper blades 22, and the blades are movable in tandem, or in phase, across the outer surface of the windshield 10.

The washer unit for the windshield 10 comprises a pump 24 having an interruptible driving connection with the motor 12 such as shown in Ziegler Patent No. 2,878,-505. The pump is connected by an intake conduit 26 with a reservoir 28 for liquid solvent, and has a delivery conduit 30 connected to a four-way coupling 32. Coupling 32 communicates with conduit 34 which, in turn, communicates with washer nozzles 36 for supplying liquid solvent onto the windshield 10 into the paths of the wiper blades 22.

The cleaning system for the rear window 40 of the vehicle likewise includes a wiper unit and a washer unit. The wiper unit includes an electric motor 42 having a rotary shaft 44 carrying a crank 46 connected by a link 48 to crank arms 50. The crank arms 50, as seen particularly in FIGURE 2, are connected to pivot shafts 52 to which wiper arms 54 are attached. The wiper arms 54 carry wiper blades 56. The wiper blades 56 are likewise movable in tandem, or in phase, across the outer surface of the rear window 40.

The rear window washer unit includes the pump 24 for the windshield cleaning system which is connected by conduit 58 to conduits 60, that communicate with nozzles 62 for discharging liquid solvent onto the rear window 40 into the paths of the wiper blades 56, as will be pointed out more particularly hereinafter.

Operation of the windshield wiper unit is controlled by a switch 38 mounted on the instrument panel, and coordinated operation of the windshield wiper unit and windshield washer unit is controlled by a push button 39 which may be mounted coaxially with the switch actuator 38. Operation of the rear window wiper unit is controlled by a second switch 64 likewise mounted on the instrument panel of the vehicle.

With particular reference to FIGURES 2 and 3, it can be seen that the pivot shafts 52 are journalled by sleeve bearings 66 and 68 in housings 70 suitably attached to the tailgate 72 of the vehicle. Each pivot 52 is formed with a reduced diameter eccentric portion 74, the full diameter portion of the shaft 52 being engaged by spaced O-ring seals 76 and 78 on opposite sides of the eccentric portion 74. The eccentric portion 74 constitutes a valve for preventing the discharge of washer solvent when the wiper blades 56 are in their parked position adjacent the upper reveal molding of the tailgate 72.

Thus, the conduit 60 is attached to a fitting 80 having threaded engagement with the housing 70, each fitting having a valve seat 82 adapted to be closed by the eccentric portion 74 of its respective shaft 52. The housings 70 also have outlet fittings 84 which communicate with conduits 86, the conduits 86 being connected to the rear washer nozzles 62. It will be appreciated that as each pivot shaft 52 is oscillated, the eccentric portion 74 will open the valve seat 82 so as to permit the flow of liquid solvent from the fitting 80 to the fitting 84. However, the eccentric portion 74 will close the valve seat 82 whenever the wiper blades 56 arrive at their parked position which constitutes, in this instance, the inboard stroke end limits of the wiper blades 56. Therefore, the rear window washer unit will be inoperative when the rear window wiper unit is "off" with the wiper blades 56 in their parked position.

As alluded to hereinbefore, the rear window 40 is capable of being raised and lowered, and to prevent operation of the rear window wiper unit when the window 40 is lowered, the energizing circuit for the motor 42 includes a rear window actuated micro switch 88 which is closed when the rear window is substantially fully raised, and open when the rear window is lowered.

The cleaning system of the vehicle operates in the following manner. To operate the windshield wiper unit alone, the driver merely actuates the switch 38 which energizes the motor 12. Likewise, to operate the rear wiper unit alone, the driver merely actuates the switch 64 which energizes the wiper motor 42 if the rear window 40 is substantially fully closed. To effect conjoint operation of the windshield washer unit and the windshield wiper unit, the push button 39 is actuated so as to complete the driving connection between the wiper motor 12 and the washer pump 24 whereby liquid solvent will be discharged onto the windshield by the pump 24 during movement of the wiper blades 22 thereacross. This coordinated system may embody means for automatically terminating operation of the washer pump after a predetermined interval or a predetermined number of wiper strokes, with operation of the wiper unit being manually controlled, or automatically shut off subsequent thereto. The rear window cleaning system will be operative concurrently with the windshield cleaning system if the driver actuates the switch 64 to energize the rear window wiper unit, since under these conditions the windshield washer pump 24 will supply liquid solvent concurrently to both the windshield nozzles 36 and the rear window nozzles 62.

While the embodiment of the invention as herein disclosed constitutes a preferred form, it is to be understood that other forms might be adopted.

What is claimed is as follows:

1. In a vehicle, a rear window capable of being raised and lowered, a rear window cleaning system comprising a rear window wiper unit and a rear window washer unit, said rear window wiper unit including an oscillatable pivot shaft, said rear window washer unit including a conduit extending proximate said pivot shaft, and valve means integral with said pivot shaft for blocking said conduit when the rear wiper unit is in its parked postion.

2. In a vehicle, a rear window capable of being raised and lowered, a rear window cleaning system comprising a rear window wiper unit and a rear window washer unit, said rear window wiper unit including a blade and arm assembly capable of movement between predetermined inboard and outboard stroke end limits, and a pivot shaft for oscillating said blade and arm assembly, said washer unit including conduit means disposed proximate said pivot shaft, and valve means integral with said pivot shaft for blocking said conduit when said blade and arm assembly is at its inboard stroke end position.

3. In a vehicle, a rear window capable of being raised and lowered, a rear window cleaning system comprising a rear window wiper unit and a rear window washer unit, said rear window wiper unit comprising a blade and arm assembly capable of movement across the outer surface of said rear window and also to a parked position, and an oscillatable pivot shaft for driving said blade and arm assembly, said rear washer unit including conduit means disposed proximate said pivot shaft, and valve means integral with said pivot shaft for blocking said conduit means when said blade and arm assembly is in its parked position.

4. In a vehicle, a rear window capable of being raised and lowered, a rear window cleaning system comprising a rear window wiper unit and a rear window washer unit, said rear window wiper unit including an electric motor, means precluding energization of said motor except when said rear window is substantially fully raised, said rear window washer unit including conduit means, and valve means blocking said conduit means when said rear window wiper unit is off.

5. In a vehicle, a rear window capable of being raised and lowered, a rear window cleaning system including a wiper unit and a washer unit, said rear window wiper unit comprising an oscillatable pivot shaft journalled in a housing, said rear window washer unit including conduit means communicating with said housing, and valve means integral with said pivot shaft for blocking said conduit means when the rear window wiper unit is in its parked position.

6. In a vehicle, a rear window, a wiper unit for said rear window including a housing having an oscillatable pivot shaft journalled therein, and a rear window washer unit including conduit means connected with said housing, said pivot shaft having an eccentric portion constituting a valve for blocking said conduit means when said rear window wiper unit is in a predetermined position.

References Cited in the file of this patent
UNITED STATES PATENTS

| | | |
|---|---|---|
| 2,274,294 | Horton | Feb. 24, 1942 |
| 2,693,612 | Zeigler et al. | Nov. 9, 1954 |